United States Patent [19]

Maier

[11] Patent Number: 4,594,131
[45] Date of Patent: Jun. 10, 1986

[54] PROCESS FOR REMOVING AMMONIA AND ACID GASES FROM PROCESS STREAMS

[75] Inventor: Edward E. Maier, Franklin Township, Westmoreland County, Pa.

[73] Assignee: United States Steel Corporation, Pittsburgh, Pa.

[21] Appl. No.: 640,063

[22] Filed: Aug. 13, 1984

[51] Int. Cl.$^4$ .................................. B01D 3/38
[52] U.S. Cl. .......................... 203/26; 203/11; 203/24; 203/27; 203/37; 203/79; 203/80; 203/92; 423/357
[58] Field of Search ............... 203/10, 11, 22, 25, 203/26, 76, 36, 37, 80, 92, 24, 79, 96, 21, 73, 27, 71, 12; 423/357, 363, 379; 202/180, 154

[56] References Cited

U.S. PATENT DOCUMENTS

| | | | |
|---|---|---|---|
| 1,928,510 | 9/1933 | Sperr, Jr. ........................... | 23/193 |
| 2,797,148 | 6/1957 | Carlson ............................... | 23/196 |
| 3,024,090 | 3/1962 | Rice .................................... | 23/196 |
| 3,186,795 | 6/1965 | Fields et al. ...................... | 23/196 |
| 3,278,423 | 10/1966 | Millar ................................ | 210/15 |
| 3,654,094 | 4/1972 | Yamagishi et al. ............... | 203/26 |
| 3,718,731 | 2/1973 | Carlson et al. ................... | 423/238 |
| 3,985,863 | 10/1976 | Rice et al. ........................ | 423/352 |
| 4,049,782 | 9/1977 | Wohler et al. ................... | 423/352 |
| 4,056,444 | 11/1977 | Weicht et al. ................... | 203/26 |
| 4,060,591 | 11/1977 | Garber et al. ................... | 423/352 |
| 4,073,862 | 2/1978 | Haese ............................... | 423/220 |
| 4,104,131 | 8/1978 | Didycz et al. ................... | 203/7 |
| 4,108,734 | 8/1978 | Kwasnoski et al. ............. | 203/36 |
| 4,111,759 | 9/1978 | Didycz et al. ................... | 203/7 |
| 4,236,974 | 12/1980 | Kuhnlein ......................... | 203/11 |
| 4,260,462 | 4/1981 | Didycz et al. ................... | 203/79 |
| 4,277,268 | 7/1981 | Spangler, Jr. .................... | 203/26 |
| 4,315,802 | 2/1982 | Tsao .................................. | 203/24 |
| 4,323,430 | 4/1982 | Glassman et al. ............... | 203/36 |
| 4,395,310 | 7/1983 | Idenden ........................... | 203/24 |

FOREIGN PATENT DOCUMENTS 2029812  3/1980  United Kingdom ............... 423/357

OTHER PUBLICATIONS

Pinder, "Vapor-Compression Evaporation With Direct Contact Heat Transfer", First International Symposium on Water Desalination, pp. 1-8.

Primary Examiner—S. Leon Bashore
Assistant Examiner—V. Manoharan
Attorney, Agent, or Firm—William L. Krayer

[57] ABSTRACT

A water purification process is described for the removal of ammonia and optionally one or more acid gases from wastewaters such as coke-plant or coal conversion wastewaters. The process involves adding alkali to these wastewaters in amounts sufficient to react with fixed ammonia salts present in the wastewater and to enable substantial amounts of the ammonia to be evolved upon distillation, and subjecting the thus treated wastewater to distillation to remove substantial amounts of the ammonia and acid gases present from the wastewater. This process is achieved by two separate and successive distillations. In this process, the vapor streams being withdrawn from the first and/or second distillations are subjected to an impurity removal process to thereby produce a vapor stream substantially reduced in impurities, and useful as a stripping vapor in this process, and then reusing this vapor stream as a stripping vapor in the process. The impurity removal process may include (1) passing a vapor stream through an ammonia absorbing solution, or (2) a sequence of steps involving compression, condensation, steam stripping and vaporization.

4 Claims, 3 Drawing Figures

PROCESS FOR REMOVING AMMONIA AND ACID GASES FROM PROCESS STREAMS

BACKGROUND OF THE INVENTION

Aqueous solutions containing ammonium compounds and especially "fixed ammonia" and optionally acid gases are a common wastewater which requires purification. Such a wastewater is produced as a by-product from coal carbonization plants. The need for such purification has become increasingly important due to the emphasis today on clean air and clean water. If the wastewater is to be discharged into a river or a stream, it is obviously necessary to reduce the noxious or toxic properties of the wastewater. On the other hand, in a coal carbonization plant it is often desirable to reuse the wastewater to "quench" the hot coke from the coke ovens. If these wastewaters contain noxious or toxic materials, then there may be a serious air pollution problem.

A common way of removing impurities from these wastewaters is by means of a two-step distillation process using distillation apparatus with a free ammonia and a fixed ammonia section. See "Industrial Chemistry", E. R. Riegel, Reinhold Publishing Corp., N.Y., 1942, pp. 265–268.

One serious problem of this two-step distillation process is the difficulty encountered in removing acid gases down to very low levels in the first distillation step, and this problem results because vapors from the second distillation, used as stripping steam in the first distillation, contain ammonia which reduces the stripping ability of the steam. One solution to this problem, described in U.S. Pat. No. 4,260,462, incorporated herein by reference, is to exclude the ammonia removed in the second distillation from entering the first, thereby maintaining a low pH in the first distillation which enhances the ability to remove acid gases in this first distillation. U.S. Pat. No. 4,260,462 describes a method using indirect heat exchange whereby the energy in the (ammonia-containing) steam from the second distillation can be recovered to generate steam for use in the first distillation. By allowing reuse in the first distillation of steam from the second distillation and the addition of various other energy saving techniques, the ammonia distillation process in U.S. Pat. No. 4,260,462 provides substantially improved ammonia removal when compared to the conventional process, and at substantially reduced energy usage.

The term "fixed ammonia salts" is used herein in its generally accepted meaning to cover those compounds of ammonia which are not decomposed by heat alone at the temperature employed in the ammonia still, but which in alkaline solution yield free ammonia. Generally, in coke-plant wastewaters, the major portion of the fixed ammonia is present as ammonium chloride. Other such compounds are ammonium thiosulfate, ammonium thiocyanate, ammonium ferrocyanide and ammonium sulfate. The term "fixed ammonia" refers to the ammonia portion of the fixed ammonia salts.

The term "free ammonia salts" as used herein is meant to include ammonia itself and also those compounds present in wastewaters from which ammonia is liberated by heat in the free ammonia still. Such compounds are ammonium carbonate, ammonium bicarbonate, ammonium sulfide, ammonium bisulfide, ammonium cyanide and ammonium carbamate. The term "free ammonia" refers to ammonia or the ammonia portion of the free ammonia salts.

The term "lime" is used herein to include any of the various chemical and physical forms of quicklime (calcium oxide), hydrated lime (calcium hydroxide), and hydraulic lime. The lime may include a number of impurities such as silica, calcium carbonate, magnesium oxide, iron oxide, and aluminum oxide. Some of them may be insoluble when added to the wastewater.

The term "acid gases" is used herein to include hydrogen cyanide, hydrogen sulfide and carbon dioxide. These gases may be present in the original wastewater as weak ammonium salts that completely dissociate into ammonia and their respective acid gases upon steam distillation.

The wastewaters described herein are generally industrial wastewaters produced by the high-temperature cracking of carbonaceous material. Often such carbonaceous materials are coal or petroleum products. Wastewater may also be formed in water-scrubbing of coke-oven gases.

SUMMARY OF THE INVENTION

A method for achieving substantially complete removal of acid gases and ammonia from a dilute aqueous solution thereof, said solution also containing free and fixed ammonia salts, the process comprising (1) subjecting the solution to a first countercurrent multi-stage continuous distillation, the distillation being conducted by heating the solution, at least in part by means of a stripping vapor, and by having a gradient of ammonia concentration decreasing towards the region of bottom liquid withdrawal which results in the bottom liquid have a pH of less than about 8.0, (a) withdrawing from this first distillation a vapor stream containing a major proportion of stripping vapor, substantially all of the acid gases in the solution, and substantially all of the ammonia from the free ammonia salts, (b) withdrawing from this distillation an aqueous bottom stream which contains substantially all of the fixed ammonia salts, (2) adding alkali to the withdrawn bottom stream, the alkali being added in an amount sufficient to evolve ammonia contained in the fixed ammonia salts during subsequent distillation of the mixture, (3) subjecting the withdrawn bottom stream to a second countercurrent multi-stage continuous distillation, (a) withdrawing from the second distillation a vapor stream the vapor stream containing a portion of the ammonia from the fixed ammonia salts, (b) withdrawing from the second distillation an aqueous bottom stream, (4) subjecting at least one of the vapor streams being withdrawn from the first and second distillations to an impurity removal process to thereby produce a vapor stream substantially reduced in impurities, and useful as a stripping vapor in this process.

The use of this invention significantly reduces the energy consumption required to remove ammonia from wastewater streams. In addition to reusing steam from the second distillation to provide steam to the first distillation (as in U.S. Pat. No. 4,260,462), a method is described whereby steam from the first distillation can be reused in the second distillation, reducing steam requirements to only the small amount required to heat the process feedwater to the temperature at which it leaves the process. This invention describes two methods by which steam from the first distillation may be made usable as stripping steam for the second distillation without disturbing the pH profiles in the distillation columns which are critically important in achieving the desired separation of ammonia and acid gases fron the wastewater. The first method involves compression, condensation, stripping and re-vaporization of the steam from the first distillation in an energy efficient manner. The second method employs the steps outlined for the first, but also utilizes the USS Phosam system for removal of ammonia from second-distillation steam. Use of the USS Phosam system (see U.S. Pat. Nos. 3,024,090 and 3,985,863 for a basic description) to remove ammonia from second-distillation steam renders it directly usable as stripping steam for the first distillation, and avoids use of indirect heat exchange as the means of recovering steam from the second distillation for use as stripping steam in the first distillation. It is now possible to maintain a very low pressure differential between distillation columns (1–2 psi instead of 10–12 psi if a heat exchanger is used) thereby eliminating the need for a vapor recirculation compressor with a relatively high compression ratio.

This process is achieved by two separate and successive distillations and comprises separating acid gases and ammonia from a dilute aqueous solution thereof, the solution also containing free and fixed ammonia salts. This solution is subjected to a first countercurrent miltistage continuous distillation, the distillation being conducted by having a gradient of ammonia concentration decreasing towards the region of bottom liquid removal which results in the bottom liquid having a pH of less than 8 when measured at 50° C. An overhead vapor stream from this distillation contains a major proportion of stripping vapor, and some of the acid gases in the solution, and some of the ammonia from the free ammonia salts. An aqueous bottom stream from this first distillation contains a major proportion of water and substantially all of the fixed ammonia salts. Alkali such as lime is then added to the bottom stream in an amount sufficient to form an insoluble precipitate and evolve ammonia contained in the fixed ammonia salts during a second distillation of the mixture. A threshold amount of at least one scale inhibitor compound may also be added to the diluted aqueous solution to thereby inhibit the deposition of scale on the trays of the distillation towers and especially the tower in which the second distillation is conducted. This bottom stream is then subjected to a second countercurrent multi-stage continuous distillation whereby an overhead vapor stream is withdrawn containing a major proportion of stripping vapor and a major proportion of the ammonia from the fixed ammonia salts, and an aqueous bottom stream is drawn, such stream having a substantially reduced concentration of acid gases and ammonia as compared to the original aqueous solution. The overhead vapor stream from the second distillation is used as the stripping vapor and to provide heat in the first distillation. Also, preferably, the overhead vapor from the first distillation is used as stripping vapor for the second distillation.

The invention described herein also includes the apparatus for carrying out the described process.

DESCRIPTION OF THE PREFERRED EMBODIMENT(S)

Figure 1:
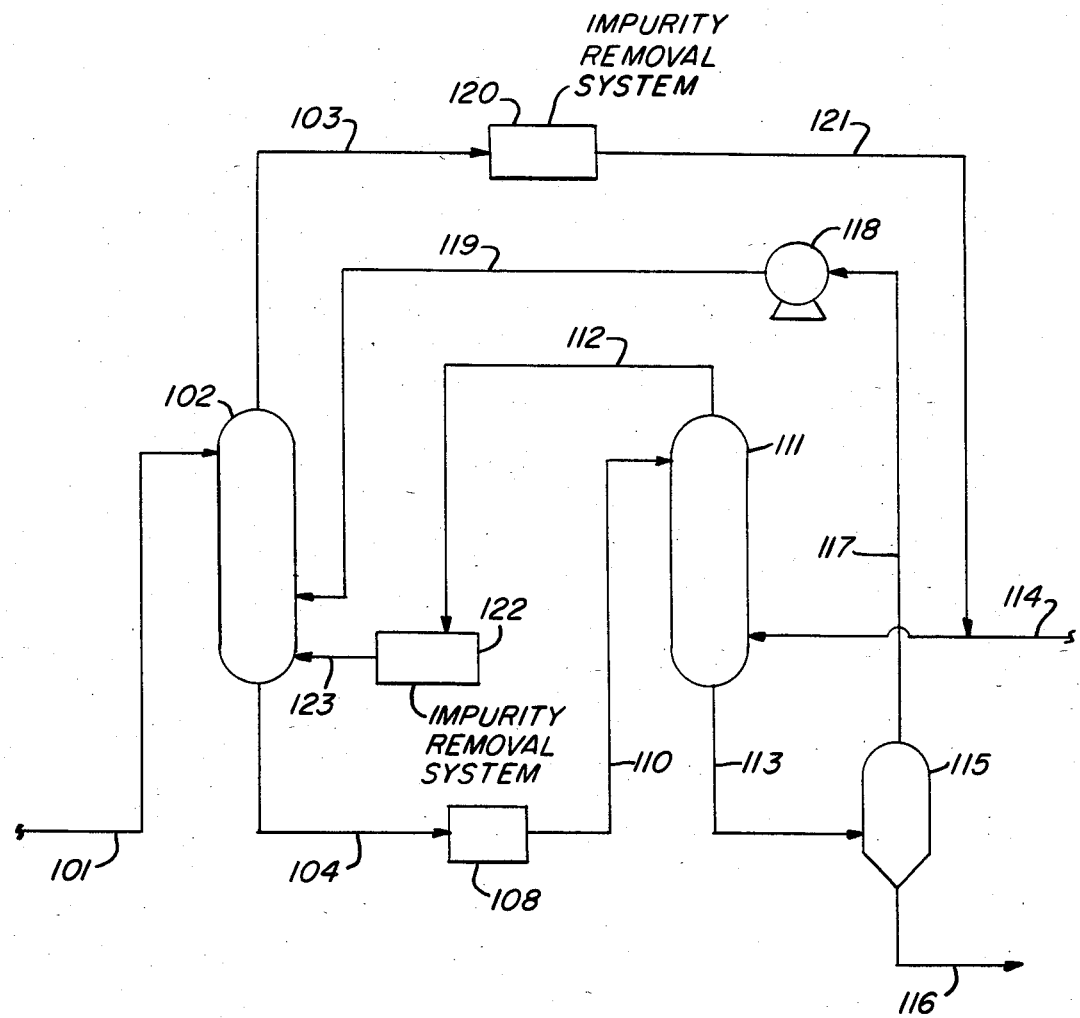
FIG. 1 is a flow diagram of the wastewater purification process of this invention.

The flow diagram of FIG. 1 shows a wastewater treatment system according to this invention for removing ammonia and acid gases from the wastewater. The aqueous feed composition is a dilute solution of acid gases, ammonia, fixed ammonia salts, and free ammonia salts. This may be wastewater from a coke-oven plant or coal conversion plant or similar installation. This solution flows by line 101 into a first distillation column 102. In this column, the solution is heated and its pH is maintained below 8. In the distillation of a multi-component liquid, the upflowing vapor which becomes enriched with the more volatile components of the liquid is described as having a stripping action on the liquid, hence, this vapor is termed a stripping vapor. The stripping vapor may be a condensable gas or a non-condensable gas or a combination of these; e.g., steam, air, hydrogen, nitrogen, and methane. The stripping vapor may be generated by vaporization of the liquid or by injecting vapor into the distillation or by a combination of these. Because this invention concerns distillation of dilute aqueous streams, the stripping vapor will generally comprise a predominant proportion of steam. The vapor from line 112, however, generally is a major component of the stripping vapor of this invention due to the energy savings possible. The overhead vapor leaving column 102 by line 103 will have a major proportion of stripping vapor such as steam and substantial amounts of the acid gases and free ammonia. Heat for the first column can be provided by direct injection of steam or other stripping medium or a combination of these; as shown, steam or stripping vapor is directly injected into the column by line 123. From the first column 102, a bottom liquid is withdrawn by line 104 and mixed with lime in chamber 108; also, grit and other readily separable solids such as precipitates can be removed in the chamber. The bottom liquid stream flows by line 110 to a second distillation column 111. In this column, the liquid is heated and an overhead vapor of ammonia and water is removed by line 112. The conditions in this second column are selected for maximum recovery of ammonia. The impurity removal systems 120 and 122 remove impurities such as ammonia and acid gases to provide a stream of relatively pure steam which can be re-used in the respective columns 102 and 111 by passing through lines 121 and 123. Additional steam is provided through line 114 to column 111. Line 113 containing an aqueous solution having a low concentration of acid gases and ammonia goes to flash evaporator 115 which removes a vapor stream having a higher concentration of ammonia and acid gases than the liquid stream 116 which is used for discharge. This vapor stream 117 goes to compressor 118 which compresses the vapor stream and passes it to column 102 by way of line 119.

Figure 2:
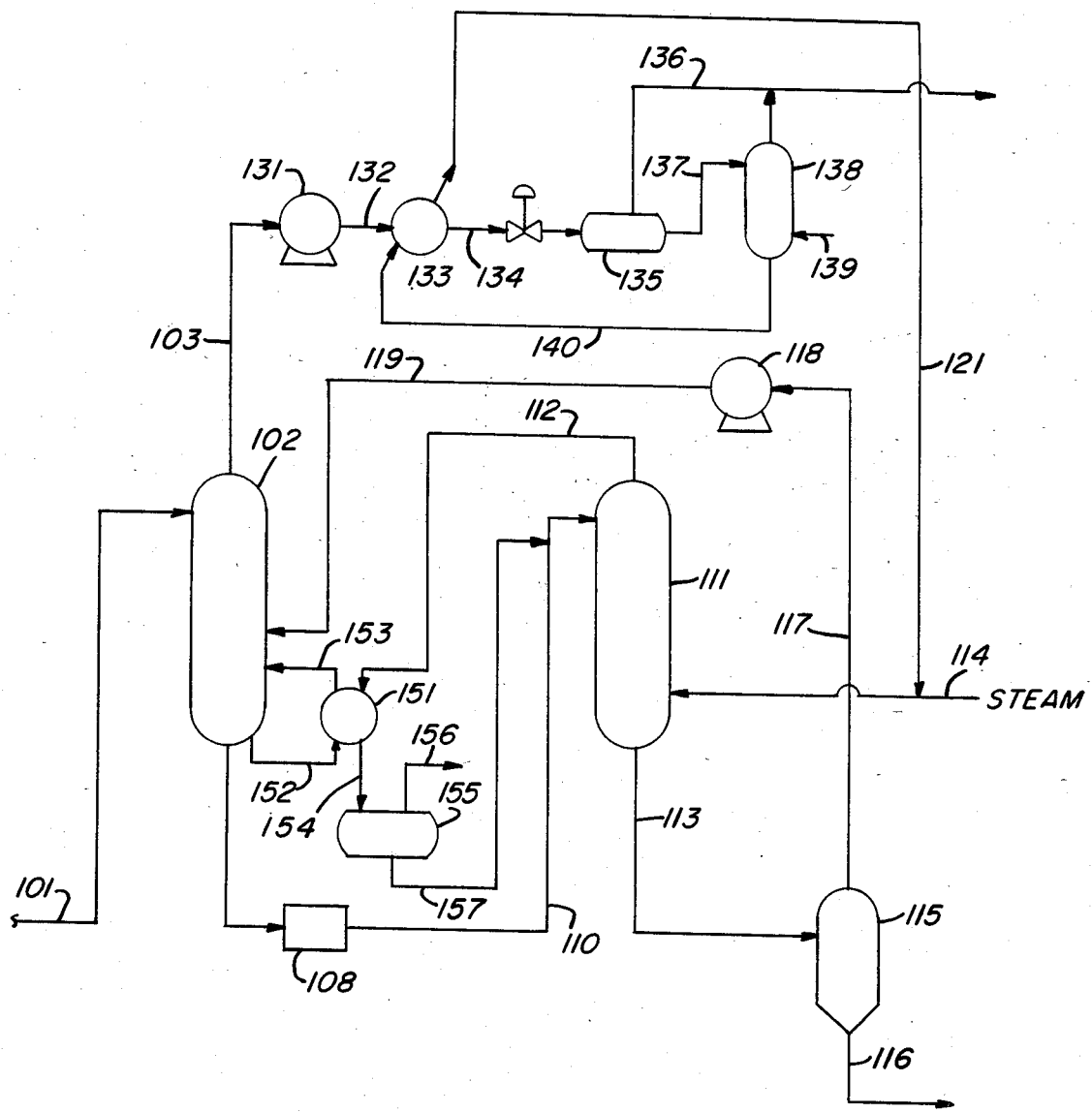
FIG. 2 and FIG. 3 are flow diagrams illustrating some of the preferred embodiments of this invention wherein specific vapor impurity removal subsystems are described as part of the overall purification system.

FIG. 2 shows a wastewater treatment system utilizing a preferred Impurity Removal System. The system of FIG. 2 is essentially identical to that of FIG. 1 except for the Impurity Removal System for the vapors from the first distillation column 102 and the description of an indirect heat exchanger for the vapors from the second distillation column 111. The overhead vapor from first distillation column 102 passes by line 103 to compressor 131 where it is compressed to a pressure somewhat higher than the pressure that is required to allow its recirculation to the second distillation column 111. The compressed vapor flows by line 132 to heat exchanger 133 where the vapor is condensed. The pressure of this condensed vapor in line 134 is then reduced, allowing a portion of the liquid (primarily acid gases and ammonia) to vaporize, and the vapor thus generated is separated from the liquid in separator 135 to form a vapor stream in line 136 and a liquid stream that flows through line 137 to a small stripping column 138 where steam is introduced through line 139 to strip the remaining ammonia and acid gases, producing a purified condensate stream that is returned to heat exchanger 133 where it is vaporized using the heat supplied by condensing stream from line 132. The resulting purified vapor stream is then recirculated via line 121 to the second distillation column 111 where it is re-used as stripping vapor. Some supplementary steam is also added to column 111 via line 114 to replace steam condensed in heating the feed wastewater in line 101 to the temperature at which water leaves the flash column 115 via line 116. This temperature increase from the stream of line 101 to the stream of line 116 may be minimized in a number of ways such as (1) operating the first distillation column 102 and the flash column 115 at sub-atmospheric pressures, or (2) heat exchanging the stream of line 116 (after a clarification step to remove residual lime solids) with the stream of line 101 to preheat the feed stream of line 101. The embodiment of the process shown here employs a second vapor recompression step wherein the vapor from the flash column 115 passes through line 117 to compressor 118 to provide additional stripping steam via line 119 to column 102.

The overhead vapor from second distillation column 111 travels via line 112 to indirect heat exchanger 151 where the vapor is condensed, and where it heats the liquid from first distillation column 102 which passes to heat exchanger 151 via line 152 and returns via line 153. The condensed vapor from indirect heat exchanger 151 passes via line 154 to separator 155 to form a vapor stream in line 156 and a liquid stream in line 157, the latter being returned to the second distillation column 111.

Figure 3:
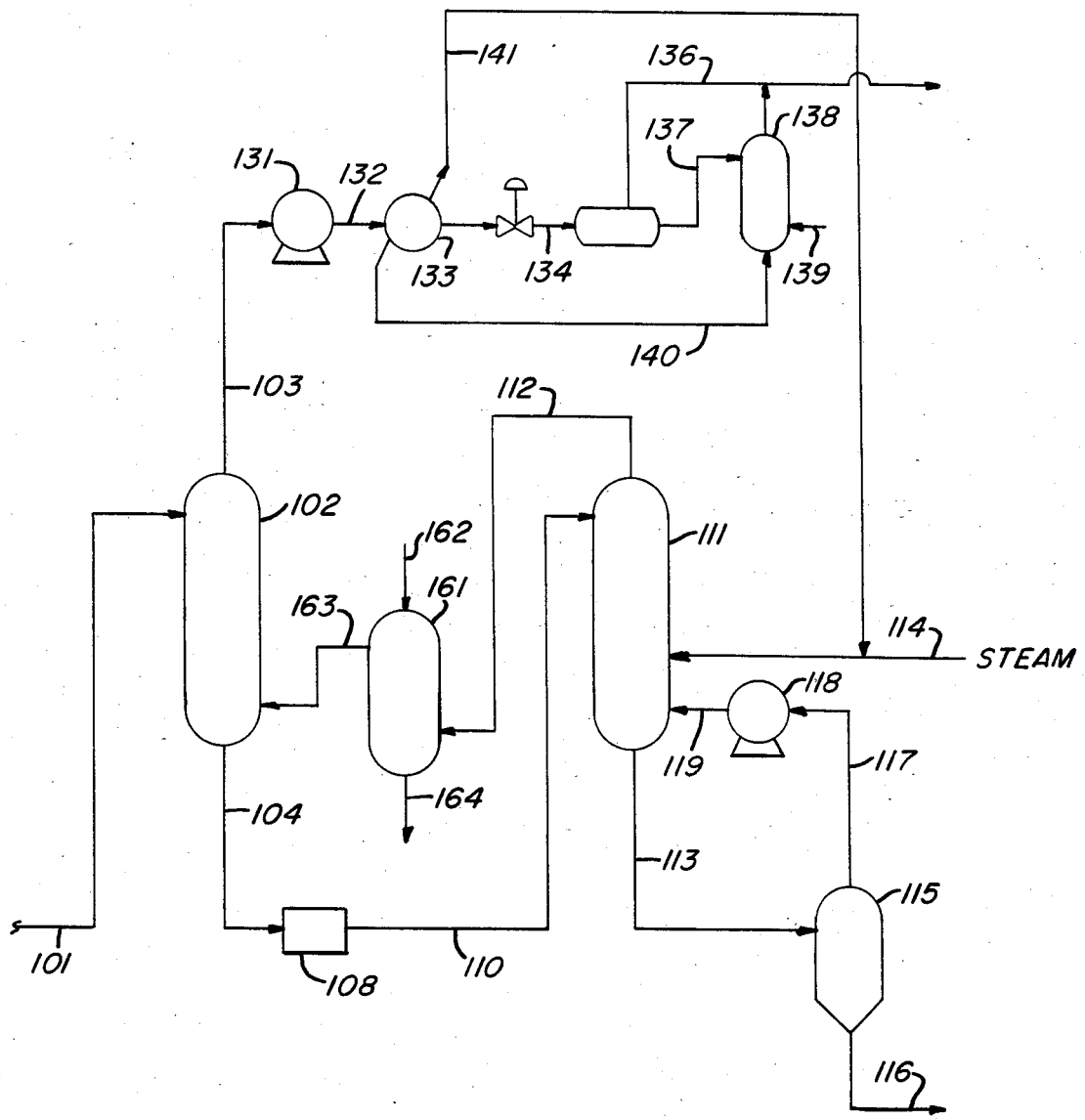

FIG. 3 describes a further variation of this invention which is essentially identical to FIG. 2 except that the indirect heat exchanger sub-system for handling the overhead vapor from the second distillation column 111 is replaced with an ammonia absorber sub-system for treating this stream. This improvement allows the vapors from second distillation column 111 be used directly as stripping vapor in first distillation column 102, while retaining the excellent cyanide and acid gas removal capability of the process. The overhead vapor from column 111 passed via line 112 through an ammonia absorber 161 which removes ammonia from the vapor stream, generating a stream of ammonia-free stripping steam which leaves absorber 161 via line 163 which can be used directly in column 102. The pressure differential between the top of the second column 111 and the bottom of the first column 102 is very low (1-2 psi instead of 10-12 psi if a heat exchanger is used). The low pressure differential between the two columns greatly reduces energy requirements for vapor recirculation compressor 131. In addition, vapor recirculation compressor 118 can be located such that it compresses the flash column 115 vapors from line 117 for injection directly into the second column 111. The ammonia containing absorbing solution leaves absorber 161 via line 164, preferably passing to an ammonia stripper to allow re-use of the absorbing solution. By utilizing the multiple distillation of this invention, low levels of toxic cyanides can be achieved in the effluent so that after biological oxidation, the treated water has such low levels of toxic substances that additional cyanide removal by way of chlorination or the like may be avoided.

Generally, the dilute aqueous solutions which will be treated by this invention are those having acid gases and ammonia in the solution together with fixed and free ammonia salts. By dilute is meant solutions having water as its major component, where the total dissolved acid gases and fixed and free ammonia are up to 10 percent by weight. The acid gases include $CO_2$, HCN, and $H_2S$ or mixtures thereof. Any one of these may be present by itself or in combination with one or more of the others.

The most common dilute aqueous solutions will contain $CO_2$, $H_2S$, and HCN with $NH_3$ as well as the fixed and free ammonia salts; Van Krevelan et al, Recueil 689 (1949) pp. 191-216 describes the vapor pressures of such solutions as well as the ionic species of acid gas salts and ammonium compounds in such solutions, which would be representative of the aqueous solutions upon which the invention may be practiced. Commonly the acid gases and free and fixed ammonia comprises up to about 0.6% by weight of the aqueous solutions.

Where the solution is a wastewater of streams collected from coke plants and coal conversion plants, other components may include tars, phenols, fluorides, chlorides, sulfates, thiosulfates, and thiocyanates. In these circumstances, the tars would be removed by decanting and then the ammonia and acid gases would be removed according to the subject invention.

The collected wastewaters from coke or other coal conversion plants are often referred to as ammoniacal liquors. The principal free and fixed salts present in the liquors are as follows:

| Free Salts | Fixed Salts |
|---|---|
| ammonium carbonate | ammonium chloride |
| ammonium bicarbonate | ammonium thiocyanate |
| ammonium sulfide | ammonium ferrocyanide |
| ammonium cyanide | ammonium thiosulfate |
| | ammonium sulfate |

In addition to ammonia and ammonium salts, the wastewaters contain low concentrations of suspended and dissolved tarry compounds. The most important of these compounds are the phenols or "tar acids", the concentration of which usually ranges from about 0.3 to about 15 grams per liter of liquor. Pyridine bases, neutral oils, and carboxylic acids are also present but in much lower concentrations.

The insoluble precipitates formed on the addition of lime to the wastewater generally include calcium sulfate, calcium sulfite, calcium carbonate, calcium fluoride, calcium phosphate or mixtures of the same.

Typical compositions of liquors from various sections of the coke oven operation are:

TABLE I

| Composition of Weak Ammonia Liquors From Several Coke Plants | | | | |
|---|---|---|---|---|
| | Ammonia-Recovery Process | | | |
| | Semidirect | | Indirect | |
| Plant | A | B | C | D |
| Ammonia, total, gpl | 7.60 | 6.20 | 4.65 | 3.59 |
| Free, gpl | 4.20 | 4.76 | 3.37 | 2.70 |

TABLE I-continued
Composition of Weak Ammonia Liquors From Several Coke Plants

| | Ammonia-Recovery Process | | | |
|---|---|---|---|---|
| | Semidirect | | Indirect | |
| Plant | A | B | C | D |
| Fixed, gpl | 3.40 | 1.44 | 1.28 | 0.89 |
| Carbon dioxide as $CO_2$, gpl | 2.35 | 3.94 | 2.78 | 1.74 |
| Hydrogen sulfide as $H_2S$, gpl | 0.86 | 0.34 | 1.26 | 1.13 |
| Thiosulfate as $H_2S_2O_3$, gpl | 0.022 | 0.51 | | |
| Sulfite as $H_2SO_3$, gpl | 2.84 | | | |
| Sulfate as $H_2SO_4$, gpl | | 0.15 | | |
| Chloride as HCl, gpl | 6.75 | 1.85 | | |
| Cyanide as HCN, gpl | 0.062 | 0.05 | | |
| Thiocyanate as HCNS, gpl | 0.36 | 0.42 | | |
| Ferrocyanide as $(NH_4)Fe(CN)_6$, gpl | 0.014 | 0.039 | | |
| Total sulfur, gpl | 1.014 | 0.57 | | |
| Phenols as $C_6H_5OH$, gpl | 0.66 | 3.07 | | |
| Pyridine bases as $C_5H_5N$, gpl | 0.48 | 0.16 | 1.27 | 0.98 |
| Organic number, cc N/50 $KMnO_4$ per liter | | | 4856 | 3368 |

TABLE II
Typical Compositions of Flushing and Primary Cooler Liquors

| Liquor | Flushing Liquor, gpl | Primary-Cooler Condensate, gpl |
|---|---|---|
| Total ammonia | 4.20 | 6.94 |
| "Free" ammonia | 1.65 | 6.36 |
| "Fixed" ammonia | 2.55 | 0.58 |
| Total sulfur | 0.668 | |
| Sulfate as sulfur trioxide | 0.212 | |
| Sulfide as hydrogen sulfide | 0.003 | |
| Ammonium thiosulfate | 0.229 | 0.29 |
| Carbonate as carbon dioxide | 0.374 | |
| Cyanide as hydrogen cyanide | 0.002 | |
| Chloride as chlorine | 8.13 | 1.05 |
| Ammonium thiocyanate | 0.82 | |
| Phenols | 3.55 | 3.20 |

A fuller discussion of the recovery of ammonia from coke oven gases and the origin of the various ammonia salt species in the various sections of coke oven plants is given in the book, COAL, COKE AND COAL CHEMICALS, P. J. Wilson and J. H. Wells, McGraw-Hill Book Company, Inc., N.Y., 1950, particularly Chapter 10, pp. 304–325.

The following Table III illustrates the range of compositions in coke plant wastewater that comprise aqueous solutions especially suitable for the practice of this invention.

TABLE III
Typical Composition Ranges for Coke Plant Waste Water

| Component | Composition Range, ppm* | | | Typical Compositions, ppm* | | |
|---|---|---|---|---|---|---|
| | | | | Waste Water No. 1 | Waste Water No. 2 | Waste Water No. 3 |
| Free ammonia | 450 | to | 10000 | 1900 | 770 | 1350 |
| Fixed ammonia | 700 | to | 4000 | 1900 | 1190 | 2440 |
| Cyanide | 2 | to | 1000 | 210 | 35 | 65 |
| Sulfide | 0 | to | 1300 | 500 | 1 | 10 |
| Carbonate | 150 | to | 4000 | 2180 | 190 | 350 |
| Chloride | 750 | to | 8500 | 2300 | 1920 | 4460 |
| Sulfate/Sulfite | 150 | to | 3000 | 310 | 325 | 415 |
| Thiosulfate | 90 | to | 600 | 440 | 115 | 300 |
| Thiocyanate | 100 | to | 1000 | 700 | 150 | 310 |
| Total sulfur | 200 | to | 2000 | 1300 | 250 | 550 |
| Fluoride | 30 | to | 150 | 60 | 40 | 75 |
| Phenols | 300** | to | 3600 | 1500 | 400 | 725 |
| pH | 7 | to | 9.1 | 9.0 | 7.5 | 7.6 |

*Parts per million by weight.
**Dephenolized coke plant waste water could contain as little as 0.1 ppm phenols.

The practice of my invention on materials such as described above can be achieved by having two successive and separate continuous distillations each operating under countercurrent multi-stage separate conditions. In the first distillation, the process conditions are selected so that substantial amounts of the acid gases and of the ammonia from the free ammonia salts are vaporized and removed from the solution.

The inlet feed temperatures may be in the range of about 60°–212° F., the overhead temperatures in the range of about 140°–265° F., and the bottom temperatures in the range of about 160°–275° F. The first distillation will be conducted at a pressure in the range of about 0.3 to 3.0 atmos. abs. The low part of the pressure range allows for efficient use of low pressure steam while the higher pressures give more efficient removal of cyanides.

The lime reacts with both fixed ammonia salts and any residual acid gases. With respect to the ammonia salts, the principal reaction is with ammonium chloride although ammonium thiocyanide and sulfate also react according to the following equations:

$$2NH_4Cl + Ca(OH)_2 \rightarrow CaCl_2 + 2NH_3 + 2H_2O$$

$$2NH_4SCN + Ca(OH)_2 \rightarrow Ca(SCN)_2 + 2NH_3 + 2H_2O$$

$$(NH_4)_2SO_4 + Ca(OH)_2 \rightarrow CaSO_4 + 2NH_3 + 2H_2O$$

The reactions between lime and any residual acid gases are according to the following equations:

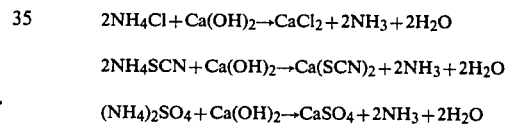

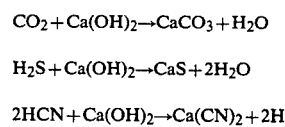

$$2HCN + Ca(OH)_2 \rightarrow Ca(CN)_2 + 2H_2O$$

The major portion of any residual acid gases is $CO_2$ and the calcium carbonate thus formed tends to consume lime and forms insoluble salts in the distillation equipment.

The treated stream is subjected to a second distillation. As noted above, the high pH and heat cause the "fixed" ammonia salts to decompose with liberation of the ammonia. The resulting overhead vapors are essentially ammonia and water. The feed temperature may be in the range of about 155°–270° F., the overhead vapors may be at a temperature in the range of about 140°–290° F., and the bottoms stream may be at a temperature in the range of about 160°–295° F. The pressure may be up to about 60 psia. The bottom stream from the second distillation will have a low concentration of total ammonia and of cyanides. The pH will be in the range of 9.5–12. The total ammonia may be as low as 25 ppm. This bottom stream can be clarified and then treated to remove other organic materials, such as phenols.

I claim:

1. A process for achieving substantially complete removal of acid gases and ammonia from a dilute aqueous solution thereof, said solution also containing free and fixed ammonia salts, said process comprising:
   (a) subjecting said solution to a first countercurrent multi-stage continuous distillation, said distillation being conducted by heating said solution, at least in part by means of a stripping vapor, and by having a gradient of ammonia concentration decreasing towards the region of bottom liquid withdrawal which results in said bottom liquid having a pH of less than about 8.0,
      (i) withdrawing from this first distillation an overhead vapor stream containing a major proportion of stripping vapor, substantially all of said acid gases from said solution, and substantially all of the ammonia from said free ammonia salts,
      (ii) withdrawing from this distillation an aqueous bottom stream which contains substantially all of said fixed ammonia salts,
   (b) adding alkali to said withdrawn bottom stream, said alkali being added in an amount sufficient to evolve ammonia contained in said fixed ammonia salts during subsequent distillation of said mixture,
   (c) subjecting said withdrawn bottom stream to a second countercurrent multi-stage continuous distillation,
      (i) withdrawing from said second distillation an overhead vapor stream said vapor steam containing a portion of the ammonia from said fixed ammonia salts,
      (ii) withdrawing from said second distillation an aqueous bottom stream, the improvement comprising:
   (d) compressing the overhead vapor stream being withdrawn from said first distillation,
   (e) condensing the compressed overhead vapor stream from said first distillation,
   (f) partially vaporizing a portion of the liquid stream produced by condensing said overhead vapor stream from said first distillation, to produce a vapor stream of ammonia and acid gases and a purified liquid stream having a reduced concentration of ammonia and acid gases, and
   (g) further purifying said liquid stream produced in step (f) by stripping the liquid with steam to remove additional ammonia and acid gases, and
   (h) vaporizing said purified liquid stream produced in step (g) to produce a vapor stream reduced in ammonia and acid gas content.

2. Process as in claim 1 wherein the vaporization of said purified liquid stream produced in step (g) is achieved by indirect heat exchange with said compressed overhead vapor stream from said first distillation to thereby condense said compressed overhead vapor stream.

3. Process of claim 1 comprising the additional step of using said vapor stream substantially reduced in ammonia and acid gas content produced in step (h) as stripping steam in said second distillation.

4. Process according to claim 1 wherein said aqueous solution is an effluent collected from the processing of coke-oven gas.

* * * * *